United States Patent
Kraftsow (10) Patent No.: US 8,150,827 B2
(45) Date of Patent: Apr. 3, 2012

(54) METHODS FOR ENHANCING EFFICIENCY AND COST EFFECTIVENESS OF FIRST PASS REVIEW OF DOCUMENTS

(75) Inventor: Andrew Kraftsow, Sedona, AZ (US)

(73) Assignee: Renew Data Corp., Austin, TX (US)

( * ) Notice: Subject to any disclaimer, the term of this patent is extended or adjusted under 35 U.S.C. 154(b) by 0 days.

(21) Appl. No.: 11/449,400

(22) Filed: Jun. 7, 2006

(65) Prior Publication Data

US 2007/0288445 A1 Dec. 13, 2007

(51) Int. Cl.
*G06F 7/00* (2006.01)
*G06F 17/30* (2006.01)

(52) U.S. Cl. ........ 707/706; 707/713; 707/722; 707/765; 707/769

(58) Field of Classification Search ........................ 707/3
See application file for complete search history.

(56) References Cited

U.S. PATENT DOCUMENTS

| | | | |
|---|---|---|---|
| 5,107,419 A | 4/1992 | MacPhail | |
| 5,350,303 A | 9/1994 | Fox et al. | |
| 5,535,381 A | 7/1996 | Kopper | |
| 5,617,566 A | 4/1997 | Malcolm | |
| 5,689,699 A | 11/1997 | Howell et al. | |
| 5,717,913 A * | 2/1998 | Driscoll | 707/5 |
| 5,732,265 A | 3/1998 | Dewitt et al. | |
| 5,742,807 A | 4/1998 | Masinter | |
| 5,778,395 A | 7/1998 | Whiting et al. | |
| 5,813,009 A | 9/1998 | Johnson et al. | |
| 5,813,015 A | 9/1998 | Pascoe | |
| 5,926,811 A | 7/1999 | Miller et al. | |
| 5,937,401 A | 8/1999 | Hillegas | |
| 5,982,370 A | 11/1999 | Kamper | |
| 6,023,710 A | 2/2000 | Steiner et al. | |
| 6,047,294 A | 4/2000 | Deshayes et al. | |
| 6,157,931 A | 12/2000 | Cane et al. | |
| 6,182,029 B1 | 1/2001 | Friedman | |
| 6,189,002 B1 | 2/2001 | Roitblat | |
| 6,199,067 B1 | 3/2001 | Geller | |
| 6,199,081 B1 | 3/2001 | Meyerzon et al. | |
| 6,216,123 B1 * | 4/2001 | Robertson et al. | 707/3 |
| 6,226,630 B1 | 5/2001 | Billmers | |
| 6,226,759 B1 | 5/2001 | Miller et al. | |
| 6,240,409 B1 * | 5/2001 | Aiken | 707/4 |

(Continued)

OTHER PUBLICATIONS

Roitblat, Herbert L. (2004), "Electronic Data Are Increasingly Important to Successful Litigation", Tends in Electronic Data.

(Continued)

*Primary Examiner* — Mohammad Ali
*Assistant Examiner* — Griselle Corbo
(74) *Attorney, Agent, or Firm* — Berry & Associates P.C.

(57) ABSTRACT

Methods for reviewing a collection of documents to identify relevant documents from the collection are provided. A search of the collection can be run based on query terms, to return a subset of responsive documents. A probability of relevancy can be determined for a document in the returned subset, and the document is removed from the subset if it does not reach a threshold probability of relevancy. Documents in a thread of a correspondence (for example, an e-mail) in the responsive documents subset can be added to the responsive documents subset. Further, an attachment to a document in the responsive documents subset can be added to the responsive documents subset. A statistical technique can be applied to determine whether remaining documents in the collection meet a predetermined acceptance level.

23 Claims, 6 Drawing Sheets

U.S. PATENT DOCUMENTS

| | | | |
|---|---|---|---|
| 6,243,713 B1* | 6/2001 | Nelson et al. | 1/1 |
| 6,256,633 B1* | 7/2001 | Dharap | 707/10 |
| 6,269,382 B1 | 7/2001 | Cabrera et al. | |
| 6,278,992 B1 | 8/2001 | Curtis et al. | |
| 6,324,548 B1 | 11/2001 | Sorenson | |
| 6,389,403 B1 | 5/2002 | Dorak | |
| 6,421,767 B1 | 7/2002 | Milillo et al. | |
| 6,477,544 B1 | 11/2002 | Bolosky et al. | |
| 6,493,711 B1 | 12/2002 | Jeffrey | |
| 6,591,261 B1* | 7/2003 | Arthurs | 1/1 |
| 6,662,198 B2 | 12/2003 | Satyanarayanan et al. | 1/1 |
| 6,708,165 B2 | 3/2004 | Jeffrey | |
| 6,745,197 B2 | 6/2004 | McDonald | |
| 6,751,628 B2 | 6/2004 | Coady | |
| 6,778,979 B2 | 8/2004 | Grefenstette et al. | |
| 6,810,395 B1 | 10/2004 | Bharat | |
| 6,834,110 B1 | 12/2004 | Marconcini et al. | |
| 6,859,800 B1* | 2/2005 | Roche et al. | 707/3 |
| 6,915,435 B1 | 7/2005 | Merriam | |
| 6,928,526 B1 | 8/2005 | Zhu et al. | |
| 6,947,954 B2 | 9/2005 | Cohen et al. | |
| 6,954,750 B2* | 10/2005 | Bradford | 1/1 |
| 6,996,580 B2 | 2/2006 | Bae et al. | |
| 7,047,386 B1 | 5/2006 | Ngai et al. | |
| 7,089,286 B1 | 8/2006 | Malik | |
| 7,137,065 B1 | 11/2006 | Huang et al. | |
| 7,146,388 B2 | 12/2006 | Stakutis et al. | |
| 7,158,970 B2* | 1/2007 | Chang et al. | 1/1 |
| 7,174,368 B2 | 2/2007 | Ross, Jr. | 709/207 |
| 7,260,568 B2 | 8/2007 | Zhang et al. | |
| 7,269,564 B1 | 9/2007 | Milsted et al. | |
| 7,284,191 B2 | 10/2007 | Grefenstette et al. | |
| 7,287,025 B2* | 10/2007 | Wen et al. | 707/5 |
| 7,313,556 B2* | 12/2007 | Gallivan et al. | 707/6 |
| 7,325,041 B2 | 1/2008 | Hara et al. | |
| 7,458,082 B1 | 11/2008 | Slaughter et al. | 719/328 |
| 7,526,478 B2* | 4/2009 | Friedman | 707/6 |
| 7,533,291 B2 | 5/2009 | Lin | |
| 7,650,341 B1 | 1/2010 | Oratovsky et al. | |
| 7,895,221 B2* | 2/2011 | Colledge et al. | 707/758 |
| 2002/0002468 A1 | 1/2002 | Spagna et al. | |
| 2002/0019814 A1 | 2/2002 | Ganesan | |
| 2002/0038296 A1 | 3/2002 | Margolus et al. | |
| 2002/0059317 A1 | 5/2002 | Black et al. | |
| 2002/0107803 A1 | 8/2002 | Lisanke et al. | |
| 2002/0107877 A1 | 8/2002 | Whiting et al. | |
| 2002/0116402 A1 | 8/2002 | Luke | |
| 2002/0120925 A1 | 8/2002 | Logan | |
| 2002/0138376 A1 | 9/2002 | Hinkle | |
| 2002/0140960 A1 | 10/2002 | Ishikawa | |
| 2002/0143737 A1 | 10/2002 | Seki et al. | |
| 2002/0143871 A1 | 10/2002 | Meyer et al. | |
| 2002/0147733 A1 | 10/2002 | Gold et al. | |
| 2002/0161745 A1 | 10/2002 | Call | 707/1 |
| 2002/0178176 A1 | 11/2002 | Sekiguchi et al. | |
| 2002/0194324 A1 | 12/2002 | Guha | |
| 2003/0028889 A1 | 2/2003 | McCoskey et al. | |
| 2003/0069803 A1 | 4/2003 | Pollitt | |
| 2003/0069877 A1 | 4/2003 | Grefenstette et al. | |
| 2003/0105718 A1 | 6/2003 | Hurtado et al. | |
| 2003/0110130 A1 | 6/2003 | Pelletier | |
| 2003/0126247 A1 | 7/2003 | Strasser et al. | |
| 2003/0126362 A1 | 7/2003 | Camble et al. | |
| 2003/0130998 A1* | 7/2003 | Fox et al. | 707/3 |
| 2003/0135464 A1 | 7/2003 | Mourad et al. | |
| 2003/0145209 A1 | 7/2003 | Eagle et al. | |
| 2003/0182304 A1 | 9/2003 | Summerlin et al. | |
| 2003/0233455 A1 | 12/2003 | Leber et al. | |
| 2004/0034632 A1* | 2/2004 | Carmel et al. | 707/5 |
| 2004/0054630 A1 | 3/2004 | Ginter et al. | |
| 2004/0064447 A1 | 4/2004 | Simske et al. | |
| 2004/0064537 A1 | 4/2004 | Anderson et al. | |
| 2004/0068604 A1 | 4/2004 | Le et al. | |
| 2004/0083211 A1* | 4/2004 | Bradford | 707/3 |
| 2004/0143609 A1 | 7/2004 | Gardner et al. | |
| 2004/0158559 A1* | 8/2004 | Poltorak | 707/3 |
| 2004/0186827 A1* | 9/2004 | Anick et al. | 707/3 |
| 2004/0193695 A1 | 9/2004 | Salo et al. | |
| 2004/0205448 A1 | 10/2004 | Grefenstette et al. | |
| 2005/0097081 A1* | 5/2005 | Sellen et al. | 707/3 |
| 2005/0097092 A1* | 5/2005 | Annau et al. | 707/3 |
| 2005/0144157 A1* | 6/2005 | Moody et al. | 707/3 |
| 2005/0160481 A1 | 7/2005 | Todd et al. | |
| 2005/0223067 A1* | 10/2005 | Buchheit et al. | 709/206 |
| 2005/0234843 A1* | 10/2005 | Beckius et al. | 707/1 |
| 2005/0283473 A1* | 12/2005 | Rousso et al. | 707/5 |
| 2006/0122998 A1* | 6/2006 | Bar-Yossef et al. | 707/5 |
| 2006/0167842 A1* | 7/2006 | Watson | 707/3 |
| 2006/0173824 A1* | 8/2006 | Bensky et al. | 707/3 |
| 2006/0230035 A1* | 10/2006 | Bailey et al. | 707/5 |
| 2007/0011154 A1* | 1/2007 | Musgrove et al. | 707/5 |
| 2007/0033177 A1* | 2/2007 | Friedman | 707/4 |
| 2007/0033183 A1* | 2/2007 | Friedman | 707/5 |
| 2007/0033410 A1 | 2/2007 | Eagle et al. | 713/176 |
| 2007/0038616 A1* | 2/2007 | Guha | 707/4 |
| 2007/0050339 A1* | 3/2007 | Kasperski et al. | 707/3 |
| 2007/0050351 A1* | 3/2007 | Kasperski et al. | 707/4 |
| 2007/0061335 A1 | 3/2007 | Ramer et al. | |
| 2007/0088687 A1* | 4/2007 | Bromm et al. | 707/4 |
| 2007/0192284 A1* | 8/2007 | Finley et al. | 707/2 |
| 2007/0198470 A1* | 8/2007 | Freedman et al. | 707/2 |
| 2007/0233692 A1 | 10/2007 | Lisa et al. | |
| 2007/0245108 A1 | 10/2007 | Yasaki et al. | |
| 2007/0253643 A1 | 11/2007 | Nagarajan | |
| 2007/0255686 A1* | 11/2007 | Kemp et al. | 707/3 |
| 2007/0266009 A1* | 11/2007 | Williams | 707/3 |
| 2007/0282811 A1* | 12/2007 | Musgrove | 707/3 |
| 2007/0282826 A1* | 12/2007 | Hoeber et al. | 707/5 |
| 2007/0288450 A1* | 12/2007 | Datta et al. | 707/5 |
| 2008/0005651 A1 | 1/2008 | Grefenstette et al. | |
| 2008/0059187 A1 | 3/2008 | Roitblat et al. | |
| 2008/0059512 A1 | 3/2008 | Roitblat et al. | |
| 2008/0077570 A1* | 3/2008 | Tang et al. | 707/5 |
| 2008/0097975 A1 | 4/2008 | Guay et al. | |
| 2008/0104032 A1* | 5/2008 | Sarkar | 707/3 |
| 2008/0147644 A1* | 6/2008 | Aridor et al. | 707/5 |
| 2008/0162498 A1* | 7/2008 | Omoigui | 707/10 |
| 2008/0195601 A1 | 8/2008 | Ntoulas et al. | |
| 2009/0024612 A1 | 1/2009 | Tang et al. | |
| 2009/0182737 A1* | 7/2009 | Melman | 707/5 |

OTHER PUBLICATIONS

Roitblat, Herbert L. (2005), "Document Retrieval", DolphinSearch, Inc.

"The Sedona Principles: Best Practices Recommendations & Principles for Addressing Electronic Document Production," The Sedona Conference Working Group Series, Jul. 2005 Version.

Amati, G. et al.; "Probabilistic Models of Information Retreival Based on Measuring the Divergence from Randomness"; ACM Transactions on Information Systems, vol. 20, No. 4. Oct. 2002.

Attar et al., "Local Feedback in Full-Text Retrieval Systems", Journal of the ACM (JACM), vol. 24, Issue 3 (Jul. 1977), pp. 397-417, ISSN:0004-5411.

Cai et al., "Automatic Query Expansion Based on Directed Divergence", Proceedings of the International Conference on Information Technology: Coding and Computing, p. 8, 2002, ISBN:0-7695-1506-1.

Cohen, E. et al.; "Processing Top k Queries from Samples"; ACM.

Conlon, S., "Automatic Web Searching and Categorizing Using Query Expansion and Focusing", (Mississippi University.), 6p, Jan. 2003.

Crestani, F. et al.; "Is This Document Relevant? . . . Probably": A Survey of Probabilistic Models in Information Retrieval; ACM Computing Surveys vol. 30, No. 4, Dec. 1998.

E. M. Voorhees, "Query expansion using lexical-semantic relations", Annual ACM Conference on Research and Development in Information Retrieval, Proceedings of the 17th annual international ACM SIGIR conference on Research and development in information retrieval, 1994, Dublin, Ireland, Aug. 1994, pp. 61-69, ISBN:0-387-1988-X.

Gauch et al., "A Corpus Analysis Approach for Automatic Query Expansion and Its Extension to Multiple Databases" *ACM Transactions on Information Systems*, vol. 17, No. 3, Jul. 1999, pp. 250-269.

Gehler, P. et al.; "The Rate Adapting Poisson Model for Information Retrieval and Object Recognition"; Proceedings of the 23rd International Conference on Machine Learning, 2006.
http://www.googleguide.com/tools.html <retrieved on Jul. 8, 2009>.
http://www.lexisnexis.com/toolbar/help/using.htm#HighlightAndClick <retrieved on Jul. 8, 2009>.
Ilyas, I. et al.; "Adaptive Rank-Aware Query Optimization in Relational Databases"; ACM Transactions on Database Systems; vol. 31. No. 4, Dec. 2006.
Luk, R. et al.; "A Comparison of Chinese Document Indexing Strategies and Retrieval Models"; ACM Transactions on Asian Language Information Processing, vol. 1, No. 3, Sep. 2002.
Margulis, E.; "Modelling Documents with Multiple Poisson Distributions"; Information Processing & Management vol. 29, No. 2, 1993.
Margulis, E.; "N-Poisson Document Modelling"; SIGIR '92.
Mei, Q. et al.; "A Study of Poisson Query Generation Model for Information Retrieval"; SIGIR '07 Proceedings, Session 12: Formal Models.
Mitra et al., "Improving Automatic Query Expansion", Annual ACM Conference on Research and Development in Information Retrieval, Proceedings of the 21st annual international ACM SIGIR conference on Research and development in information retrieval, Melbourne, Australia, pp. 206-214, Year of Publication: 1998, ISBN:1- 58113-015-5.
Ozmutlu, H. et al.; "Analysis of large data logs: an application of Poisson sampling on excite web queries"; Information Processing and Management, vol. 38, 2002.
Robertson, S. et al.; "Some Simple Effective Approximations to the 2-Poisson Model for Probabilistic Weighted Retreival"; Centre for Interactive Systems Research, London.
Roelleke, T.; "A Frequency-based and a Poisson-based Definition of the Probability of Being Informative"; SIGIR '03.
Tao, Y. et al.; "Indexing Multi-Dimensional Uncertain Data with Arbitrary Probability Density Functions"; Proceedings of the 31st VLDB Conference, Norway 2005.
Volkmer et al., "Exploring Automatic Query Refinement for Text-Based Video Retrieval", *IEEE International Conference on Multimedia and Expo*, Jul. 9-12, 2006, pp. 765-768, Toronto, Ont., ISBN: Jan. 4244-0366-7.
Xu et al., "Query expansion using local and global document analysis," in Proc. of ACM-SIGIR 1996, Zurich, Switzerland, Aug. 18-22, 1996, pp. 4-11.
Yan, T. et al.; "The SIFT Information Dissemination System"; ACM Transactions on Database Systems, vol. 24, No. 4, Dec. 1999.
Zakariah, R. et al.; "Detecting Junk Mails by Implementing Statistical Theory"; IEEE Proceedings of the 20th International Conference on Advanced Information Networking and Applications, 2006.
Meng, W., et al., "Building Efficient and Effective Metasearch Engines," *ACM Computing Surveys, ACM*, New York, NY, US, US, vol. 34, No. 1, Mar. 1, 2002, pp. 48-89.
Comparing IBM Tivoli Storage Manager and VERITAS NetBackup in Real-World Environments. A summary by IBM of the whitepaper and benchmark written by Progressive Strategies, Nov. 8, 2002.
Beyond Backup Toward Storage Management by M. Kaczmarski, T. Jiang and D.A. Pease. IBM Systems Journal, vol. 42, pp. 322-337, Nov. 2, 2003.
PCT Search Report and Written Opinion dated Jun. 18, 2008, PCT/US07/13483.
PCT Search Report and Written Opinion dated May 8, 2009, PCT/US2009/032990.

* cited by examiner

METHODS FOR ENHANCING EFFICIENCY AND COST EFFECTIVENESS OF FIRST PASS REVIEW OF DOCUMENTS

FIELD

The present disclosure relates to review of documents, and, more specifically, to techniques for reviewing a collection of documents to identify relevant documents from the collection, efficiently and with a relatively high level of cost effectiveness.

BACKGROUND

In the current information age, management of documents in electronic or paper form can be a daunting task for an enterprise or other organization. For example in the context of a lawsuit in the United States, document discovery can entail an enormous task and large expense, both for the party seeking the discovery as well as for the party producing documents in response to document requests from the former.

There is a great need for automated methods for identifying relevant documents. The common method of discovery today is to round up every document written or received by named individuals during a time period in question and then read them all to determine responsiveness to discovery requests. This approach is obviously prohibitively expensive and time consuming, and the burden from pursuing such an approach is increasing in view of the trend of increasing volume of documents.

It has been proposed to use search engine technology to make the document review process more manageable. However, the quality and completeness of search results from conventional search engine techniques are indeterminable and therefore unreliable. For example, one does not know whether the search engine has indeed found every relevant document, at least not with any certainty.

The main search engine technique currently used is keyword or free-text search coupled with indexing of terms in the documents. A user enters a search query consisting of one or a few words or phrases and the search system returns all of the documents that have been indexed as having one or more those words or phrases in the search query. As more documents are indexed, more documents are expected to contain the specified search terms. However, such a search technique only marginally reduces the number of documents to be reviewed, and the large quantities of documents returned cannot be usefully examined by the user. There is no guarantee that the desired information is contained by any of the returned documents.

Further, many of the documents retrieved in a standard search are typically irrelevant because these documents use the searched-for terms in a way or context different from that intended by the user. Words have multiple meanings. One dictionary, for example, lists more than 50 definitions for the word "pitch." We generally do not notice this ambiguity in ordinary usage because the context in which the word appears allows us to pick effortlessly the appropriate meaning of the word for that situation.

In addition, conventional search engine techniques often miss relevant documents because the missed documents do not include the search terms but rather include synonyms of the search terms. That is, the search technique fails to recognize that different words can mean approximately the same thing. For example, "elderly," "aged," "retired," "senior citizens," "old people," "golden-agers," and other terms are used, to refer to the same group of people. A search based on only one of these terms would fail to return a document if the document used a synonym rather than the search term. Some search engines allow the user to use Boolean operators. Users could solve some of the above-mentioned problems by including enough terms in a query to disambiguate its meaning or to include the possible synonyms that might be used.

However, unlike the familiar internet search where one is primarily concerned with finding any document that contains the precise information one is seeking, discovery in a litigation or lawsuit is about finding every document that contains information relevant to the subject. An internet search requires high precision whereas the discovery process requires both high precision and high recall.

For the purposes of discovery in a lawsuit or other legal proceeding, search queries are typically developed with the object of finding every relevant document regardless of the specific nomenclature used in the document. This necessitates developing lists of synonyms and phrases that encompass every imaginable word usage combination. In practice, the total number of documents returned by these queries is very large.

Methodologies that rely exclusively on technology to determine which documents in a collection are relevant to a lawsuit have not gained wide acceptance regardless of the technology used. These methodologies are often deemed unacceptable because the algorithms used by the machines to determine relevancy are incomprehensible to most parties to a law suit.

There is a need for improved techniques that facilitate the review of a large set of documents, and returns a subset of the documents with a predetermined, high probability that they are relevant.

SUMMARY

This disclosure describes assorted techniques which can be applied in the review of a collection of documents to identify relevant documents from the collection.

A search of the collection can be run based on query terms, to return a subset of responsive documents. In one exemplary embodiment, a probability of relevancy is determined for a document in the returned subset, and the document is removed from the subset if it does not reach a threshold probability of relevancy. A statistical technique can be applied to determine whether remaining documents (that is, not in the responsive documents subset) in the collection meet a predetermined acceptance level.

In another exemplary embodiment, documents in a thread of a correspondence (for example, an e-mail) in the responsive documents subset can be added to the responsive documents subset the responsive documents in the responsive documents subset are scanned to automatically identify a correspondence (for example, an e-mail) in the responsive documents subset, additional documents in a thread of the correspondence automatically identified, and the additional documents are added to the responsive documents subset.

In another exemplary embodiment, the responsive documents in the responsive documents subset are scanned to automatically determine whether any of the responsive documents include an attachment that is not in the subset, and any such attachment is added to the responsive documents subset In another exemplary embodiment, (a) a predetermined number of documents are randomly selected from a remainder of the collection of documents not in the responsive documents subset, (b) the randomly selected documents are reviewed to determine whether the randomly selected documents include additional relevant documents, (c) if there are additional relevant documents, one or more specific terms in the additional responsive documents that render the documents relevant are identified, the query terms are expanded with the specific terms, and the search is re-run with the expanded query terms.

BRIEF DESCRIPTION OF THE DRAWINGS

The features of the present application can be more readily understood from the following detailed description with reference to the accompanying drawings wherein.

DETAILED DESCRIPTION

Non-limiting details of exemplary embodiments are described below, including discussions of theory and experimental simulations which are set forth to aid in an understanding of this disclosure but are not intended to, and should not be construed to, limit in any way the claims which follow thereafter.

Full citations for a number of publications may be found immediately preceding the claims. The disclosures of these publications are hereby incorporated by reference into this application in order to more fully describe the state of the art as of the date of the methods and apparatuses described and claimed herein. In order to facilitate an understanding of the discussion which follows one may refer to the publications for certain frequently occurring terms which are used herein.

Figure 1:
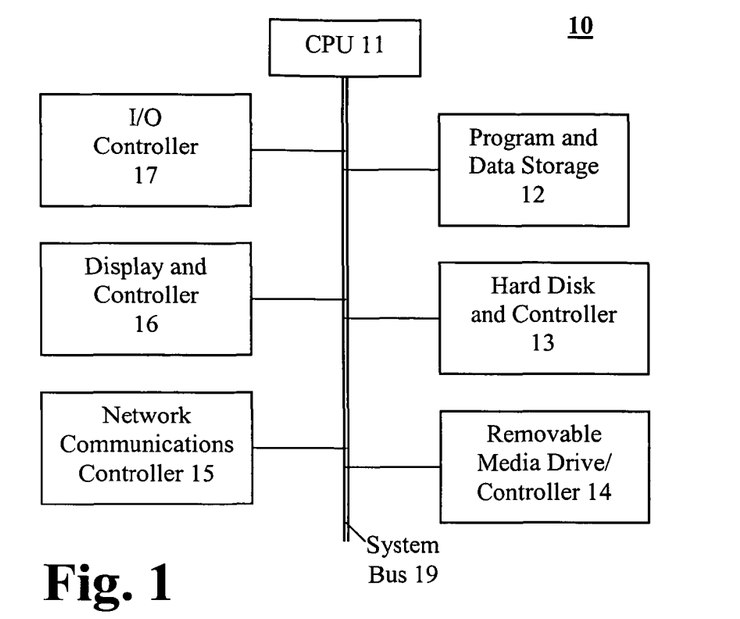
FIG. 1: A block diagram of a computer or information terminal on which programs can run to implement the methodologies of this disclosure.

One or more computer programs may be included in the implementation of the apparatuses and methodologies of this application. The computer programs may be stored in a machine-readable program storage device or medium and/or transmitted via a computer network or other transmission medium. An exemplary configuration of a computer on which the programs can run is shown in FIG. 1. Computer 10 includes CPU 11, program and data storage 12, hard disk (and controller) 13, removable media drive (and controller) 14, network communications controller 15 (for communications through a wired or wireless network), display (and controller) 16 and I/O controller 17, all of which are connected through system bus 19.

Some examples of methodologies, in accordance with this disclosure, for reviewing a collection of documents to identify relevant documents from the collection will now be discussed.

Figure 2:
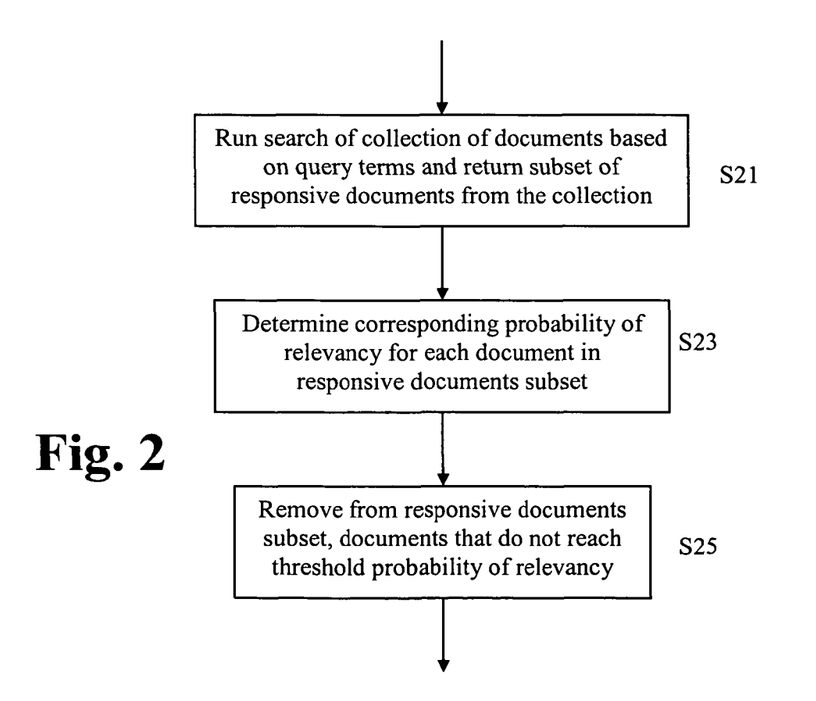
FIG. 2: A flow chart for a method for reviewing a collection of documents to identify relevant documents from the collection, according to an exemplary embodiment.

In one example (FIG. 2), a method for reviewing a collection of documents to identify relevant documents from the collection can comprise running a search of the collection of documents based on a plurality of query terms and returning a subset of responsive documents from the collection (step S21), determining a corresponding probability of relevancy for each document in the responsive documents subset (step S23) and removing from the responsive documents subset, documents that do not reach a threshold probability of relevancy (step S25).

Some additional features which are optional include the following.

The techniques discussed in this disclosure are preferably automated as much as possible.

Therefore, the search is preferably applied through a search engine. The search can include a concept search, and the concept search is applied through a concept search engine. Such searches and other automated steps or actions can be coordinated through appropriate programming, as would be appreciated by one skilled in the art.

The probability of relevancy of a document can be scaled according to a measure of obscurity of the search terms found in the document.

The method can further comprise randomly selecting a predetermined number of documents from a remaining subset of the collection of documents not in the responsive documents subset, and determining whether the randomly selected documents include additional relevant documents, and in addition, optionally, identifying one or more specific terms in the additional relevant documents that render the documents relevant, expanding the query terms with the specific terms, and re-running at least the search with the expanded query terms. If the randomly selected documents include one or more additional relevant documents, the query terms can be expanded and the search re-run with the expanded query terms. The method can additionally comprise comparing a ratio of the additional relevant documents and the randomly selected documents to a predetermined acceptance level, to determine whether to apply a refined set of query terms.

The method can further comprise selecting two or more search terms, identifying synonyms of the search terms, and forming the query terms based on the search terms and synonyms.

The method can further comprise identifying a correspondence between a sender and a recipient, in the responsive documents subset, automatically determining one or more additional documents which are in a thread of the correspondence, the additional documents not being in the responsive documents subset, and adding the additional documents to the responsive documents subset. The term "correspondence" is used herein to refer to a written or electronic communication (for example, letter, memo, e-mail, text message, etc.) between a sender and a recipient, and optionally with copies going to one or more copy recipients.

The method can further comprise determining whether any of the documents in the responsive documents subset includes an attachment that is not in the responsive documents subset, and adding the attachment to the responsive documents subset.

The method can further comprise applying a statistical technique (for example, zero-defect testing) to determine whether remaining documents not in the responsive documents set meets a predetermined acceptance level.

The search can include (a) a Boolean search of the collection of documents based on the plurality of query terms, the Boolean search returning a first subset of responsive documents from the collection, and (b) a second search by applying a recall query based on the plurality of query terms to remaining ones of the collection of documents which were not returned by the Boolean search, the second search returning a second subset of responsive documents in the collection, and wherein the responsive documents subset is constituted by the first and second subsets. The first Boolean search may apply a measurable precision query based on the plurality of query terms. The method can optionally further include automatically tagging each document in the first subset with a precision tag, reviewing the document bearing the precision tag to determine whether the document is properly tagged with the precision tag, and determining whether to narrow the precision query and rerun the Boolean search with the narrowed query terms. The method can optionally further comprise automatically tagging each document in the second subset with a recall tag, reviewing the document bearing the recall tag to determine whether the document is properly tagged with the recall tag, and determining whether to narrow the recall query and rerun the second search with the narrowed query terms. The method can optionally further include reviewing the first and second subsets to determine whether to modify the query terms and rerun the Boolean search and second search with modified query terms.

Figure 3:
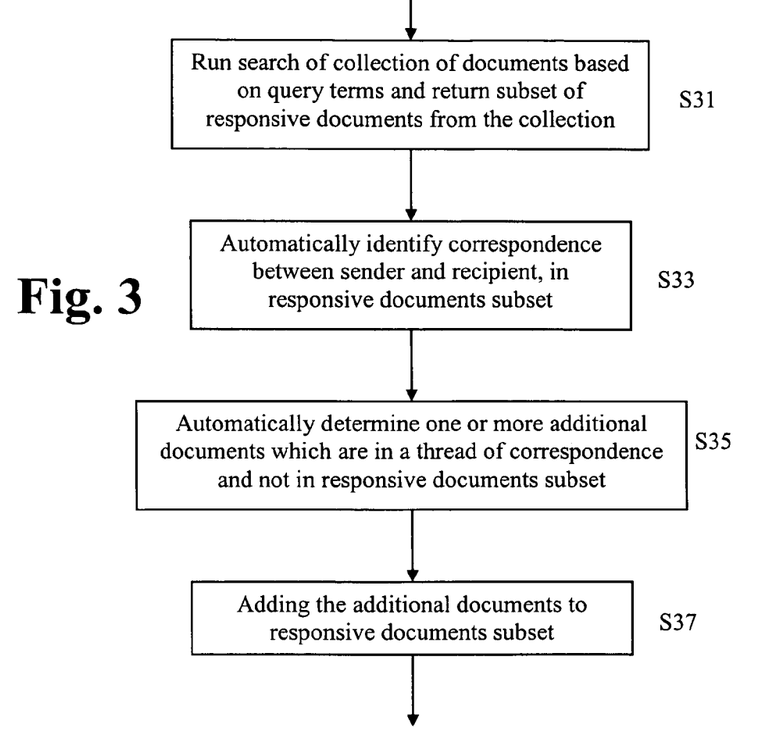
FIG. 3: A flow chart for a method for reviewing a collection of documents to identify relevant documents from the collection, according to another exemplary embodiment.

In another example (FIG. 3), a method for reviewing a collection of documents to identify relevant documents from the collection includes running a search of the collection of documents, based on a plurality of query terms, the search returning a subset of responsive documents in the collection (step S31), automatically identifying a correspondence between a sender and a recipient, in the responsive documents subset (step S33), automatically determining one or more additional documents which are in a thread of the correspondence, the additional documents not being in the responsive documents subset (step S35), and adding the additional documents to the responsive documents subset (step S37).

Some additional features which are optional include the following.

The method can further comprise determining for each document in the responsive documents subset, a corresponding probability of relevancy, and removing from the responsive documents subset documents that do not reach a threshold probability of relevancy. The probability of relevancy of a document can be scaled according to a measure of obscurity of the search terms found in the document.

The method can further comprise applying a statistical technique to determine whether a remaining subset of the collection of documents not in the responsive documents subset meets a predetermined acceptance level.

The method can additionally comprise randomly selecting a predetermined number of documents from a remainder of the collection of documents not in the responsive documents subset, determining whether the randomly selected documents include additional relevant documents, identifying one or more specific terms in the additional relevant documents that render the documents relevant, expanding the query terms with the specific terms, and re-running the search with the expanded query terms.

The method can further include randomly selecting a predetermined number of documents from a remainder of the collection of documents not in the responsive documents subset, determining whether the randomly selected documents include additional relevant documents, comparing a ratio of the additional relevant documents and the randomly selected documents to a predetermined acceptance level, and expanding the query terms and rerunning the search with the expanded query terms, if the ratio does not meet the predetermined acceptance level.

The method can further comprise selecting two or more search terms, identifying synonyms of the search terms, and forming the query terms based on the search terms and synonyms.

The method can additionally include determining whether any of the responsive documents in the responsive documents subset includes an attachment that is not in the subset, and adding the attachment to the subset.

Figure 4:
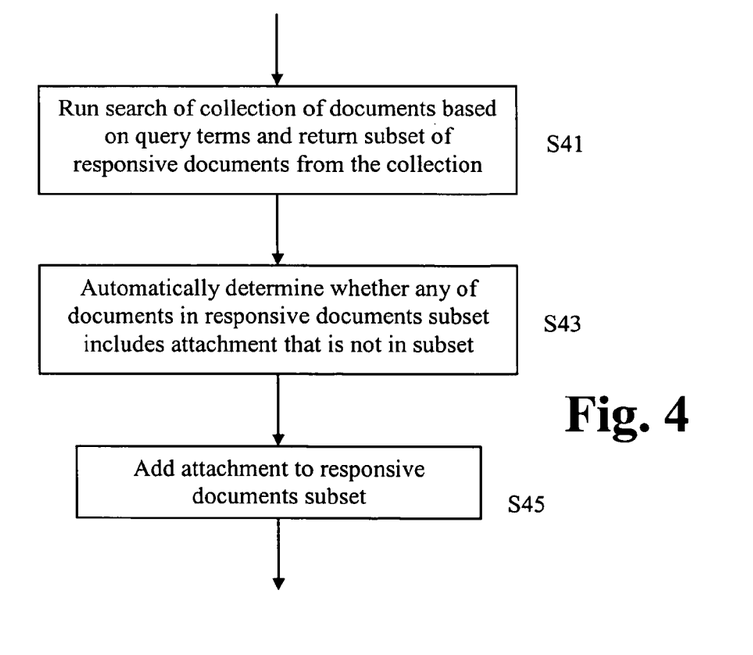
FIG. 4: A flow chart for a method for reviewing a collection of documents to identify relevant documents from the collection, according to another exemplary embodiment.

In another example (FIG. 4), a method for reviewing a collection of documents to identify relevant documents from the collection can comprise running a search of the collection of documents, based on a plurality of query terms, the search returning a subset of responsive documents in the collection (step S41), automatically determining whether any of the responsive documents in the responsive documents subset includes an attachment that is not in the subset (step S43), and adding the attachment to the responsive documents subset (step S45).

Some additional features which are optional include the following.

The method can further comprise determining for each document in the responsive documents subset, a corresponding probability of relevancy, and removing from the responsive documents subset documents that do not reach a threshold probability of relevancy. The probability of relevancy of a document is preferably scaled according to a measure of obscurity of the search terms found in the document.

The method can additionally comprise applying a statistical technique to determine whether a remaining subset of the collection of documents not in the responsive documents subset meets a predetermined acceptance level.

The method can further include randomly selecting a predetermined number of documents from a remainder of the collection of documents not in the responsive documents subset, determining whether the randomly selected documents include additional relevant documents, identifying one or more specific terms in the additional responsive documents that render the documents relevant, expanding the query terms with the specific terms, and re-running the search with the expanded query terms.

The method can further include selecting two or more search terms, identifying synonyms of the search terms, and forming the query terms based on the search terms and synonyms.

The method can further comprise identifying a correspondence between a sender and a recipient, in the responsive documents subset, automatically determining one or more additional documents which are in a thread of the correspondence, the additional documents not being in the responsive documents subset, and adding the additional documents to the responsive documents subset.

Figure 5:
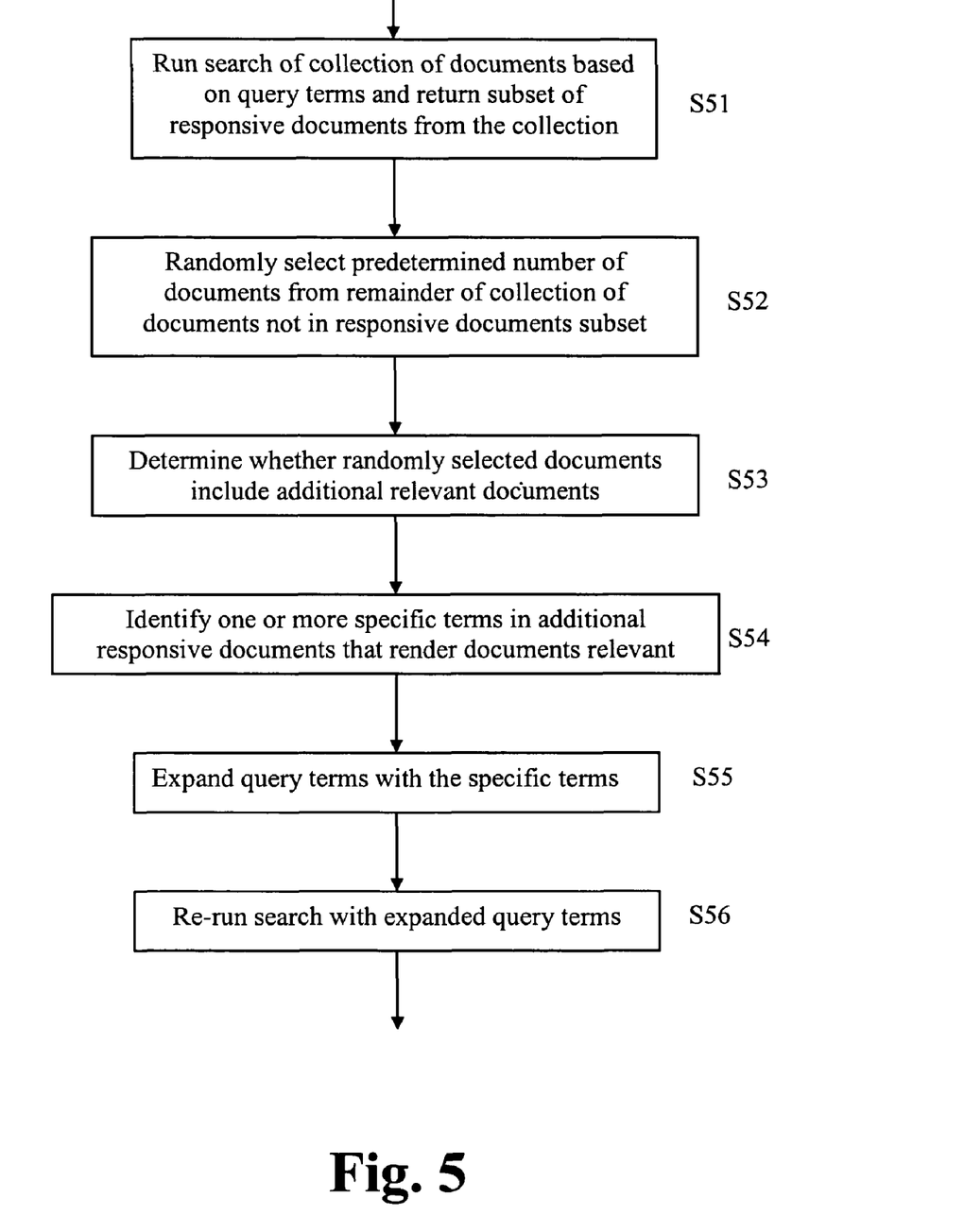
FIG. 5: A flow chart for a method for reviewing a collection of documents to identify relevant documents from the collection, according to another exemplary embodiment.

In another example (FIG. 5), a method for reviewing a collection of documents to identify relevant documents from the collection comprises running a search of the collection of documents, based on a plurality of query terms, the search returning a subset of responsive documents from the collection (step S51), randomly selecting a predetermined number of documents from a remainder of the collection of documents not in the responsive documents subset (step S52), determining whether the randomly selected documents include additional relevant documents (step S53), identifying one or more specific terms in the additional responsive documents that render the documents relevant (step S54), expanding the query terms with the specific terms (step S55), and re-running the search with the expanded query terms (step S56).

Figure 6:
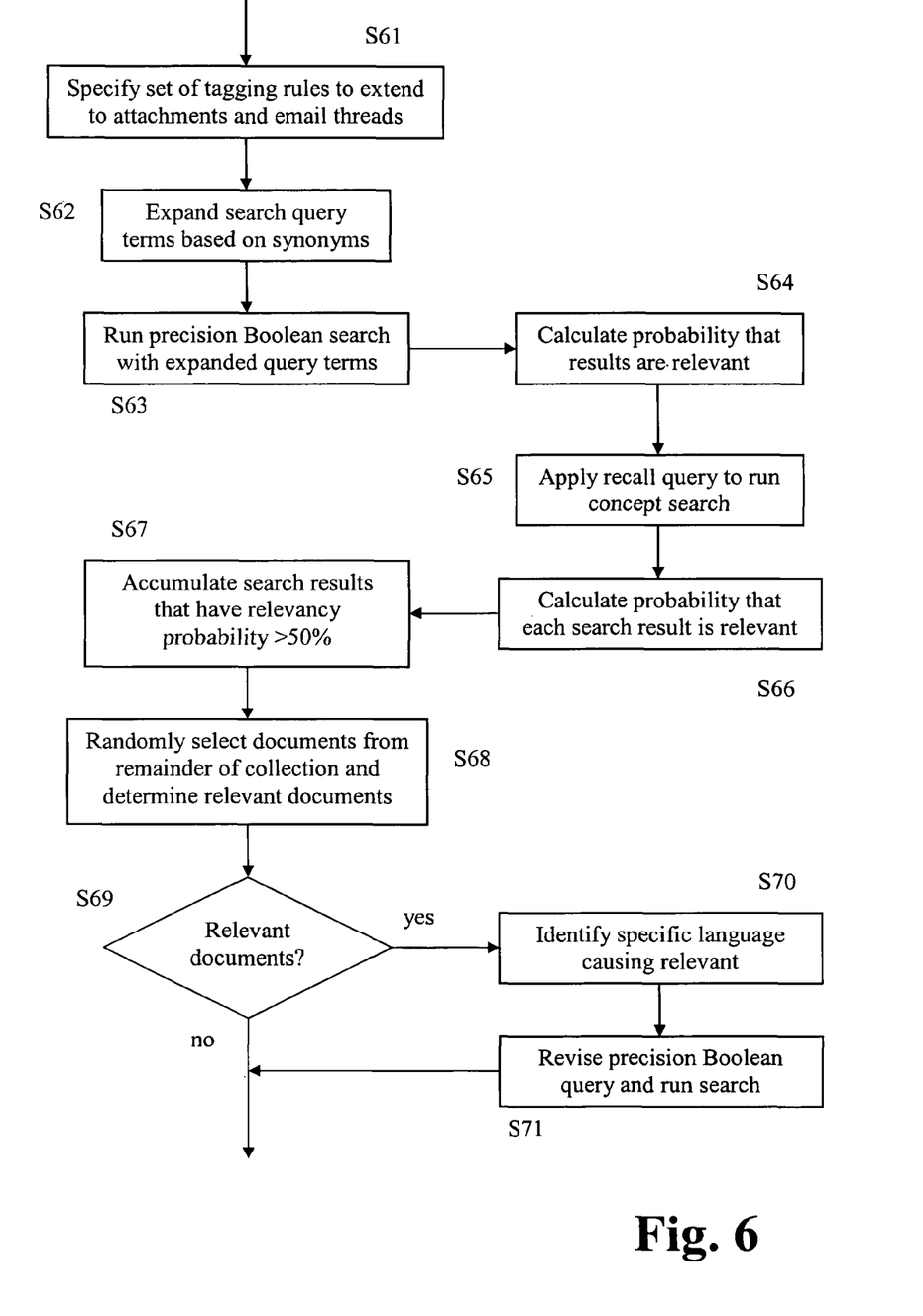
FIG. 6: A flow chart for a method for reviewing a collection of documents to identify relevant documents from the collection, according to another exemplary embodiment.

In another example (FIG. 6), a method for reviewing a collection of documents to identify relevant documents from the collection can comprise specifying a set of tagging rules to extend query results to include attachments and email threads (step S61), expanding search query terms based on synonyms (step S62), running a precision Boolean search of the collection of documents, based on two or more search terms and returning a first subset of potentially relevant documents in the collection (step S63), calculating the probability that the results of each Boolean query are relevant by multiplying the probability of relevancy of each search term, where those individual probabilities are determined using an algorithm constructed from the proportion of relevant synonyms for each search term (step S64), applying a recall query based on the two or more search terms to run a second concept search of remaining ones of the collection of documents which were not returned by the first Boolean search, the second search returning a second subset of potentially relevant documents in the collection (step S65), calculating the probability that each search result in the recall query is relevant to a given topic based upon an ordering of the concept search results by relevance to the topic by vector analysis (step S66), accumulating all search results that have a relevancy probability of greater than 50% into a subset of the collection (step S67), randomly selecting a predetermined number of documents from the remaining subset of the collection and determining whether the randomly selected documents include additional relevant documents (step S68), if additional relevant documents are found (step S69, yes), identifying the specific language that causes relevancy, and expanding that language into a set of queries (step S70), constructing and running precision Boolean queries of the entire document collection above (step S71).

The following discussions of theory and exemplary embodiments are set forth to aid in an understanding of the subject matter of this disclosure but are not intended to, and should not be construed to, limit in any way the invention as set forth in the claims which follow thereafter.

As discussed above, one of the problems with using conventional search engine techniques in culling a collection of documents is that such techniques do not meet the requirements of recall and precision.

However, by using statistical sampling techniques it is possible to state with a defined degree of confidence the percentage of relevant documents that may have been missed. Assuming the percentage missed is set low enough (1%) and the confidence level is set high enough (99%), this statistical approach to identifying relevant documents would likely satisfy most judges in most jurisdictions. The problem then becomes how to select a subset of the document collection that is likely to contain all responsive documents. Failure to select accurately results in an endless cycle of statistical testing.

The probability that results of a simple Boolean search (word search) are relevant to a given topic is directly related to the probability that the query terms themselves are relevant, i.e. that those terms are used within a relevant definition or context in the documents. Similarly, the likelihood that a complex Boolean query will return relevant documents is a function of the probability that the query terms themselves are relevant.

For example, the documents collected for review in today's lawsuits contain an enormous amount of email. It has been found that corporate email is not at all restricted to "business as such" usage. In fact, it is hard to distinguish between personal and business email accounts based on subject matter. As a consequence, even though a particular word may have a particular meaning within an industry, the occurrence of that word in an email found on a company server does not guarantee that is it has been used in association with its "business" definition.

An exemplary method for determining a probability of relevancy to a defined context is discussed below.

The following factors can be used to determine the probability that a word has been used in the defined context within a document: (1) the number of possible definitions of the word as compared to the number of relevant definitions; and (2) the relative obscurity of relevant definitions as compared to other definitions.

Calculation of the first factor is straightforward. If a word has five potential definitions (as determined by a credible dictionary) and if one of those definitions is responsive, then the basic probability that word is used responsively in any document retrieved during discovery is 20% (⅕). This calculation assumes, however, that all definitions are equally common, that they are all equally likely to be chosen by a writer describing the subject matter. Of course, that is generally not the case; some definitions are more "obscure" than others meaning that users are less likely to chose the word to impart that meaning. Thus, a measure of obscurity must be factored into the probability calculation.

A social networking approach can be taken to measure obscurity. The following method is consistent with the procedure generally used in the legal field currently for constructing query lists: (i) a list of potential query terms (keywords) is developed by the attorney team; (ii) for each word, a corresponding list of synonyms is created using a thesaurus; (iii) social network is drawn (using software) between all synonyms and keywords; (iv) a count of the number of ties at each node in the network is taken (each word is a node); (v) an obscurity factor is determined as the ratio between the number of ties at any word node and the greatest number of ties at any word node, or alternatively their respective z scores; and (vi) this obscurity factor is applied to the definitional probability calculated above.

The method described above calculates the probability that a given word is used in a relevant manner in a document. Boolean queries usually consist of multiple words, and thus a method of calculating the query terms interacting with each other is required.

The simplest complex queries consist of query terms separated by the Boolean operators AND and/or OR. For queries separated by an AND operator, the individual probabilities of each word in the query are multiplied together to yield the probability that the complex query will return responsive results. For query terms separated by an OR operator, the probability of the query yielding relevant results is equal to the probability of the lowest ranked search term in the query string.

Query words strung together within quotation marks are typically treated as a single phrase in Boolean engines (i.e. they are treated as if the string is one word). A document is returned as a result if and only if the entire phrase exists within the document. For purposes of calculating probability, the phrase is translated to its closest synonym and the probability of that word is assigned to the phrase. Moreover, since a phrase generally has a defined part of speech (noun, verb, adjective, etc.), when calculating probability one considers only the total number of possible definitions for that part of speech, thereby reducing the denominator of the equation and increasing the probability of a responsive result.

Complex Boolean queries can take the form of "A within X words B", where A and B are query terms and X is the number of words in separating them in a document which is usually a small number. The purpose of this type of query, called a proximity query, is to define the terms in relation to one another. This increases the probability that the words will be used responsively. The probability that a proximity query will return responsive documents equals the probability of the highest query term in the query will be responsive.

Figure 7A:
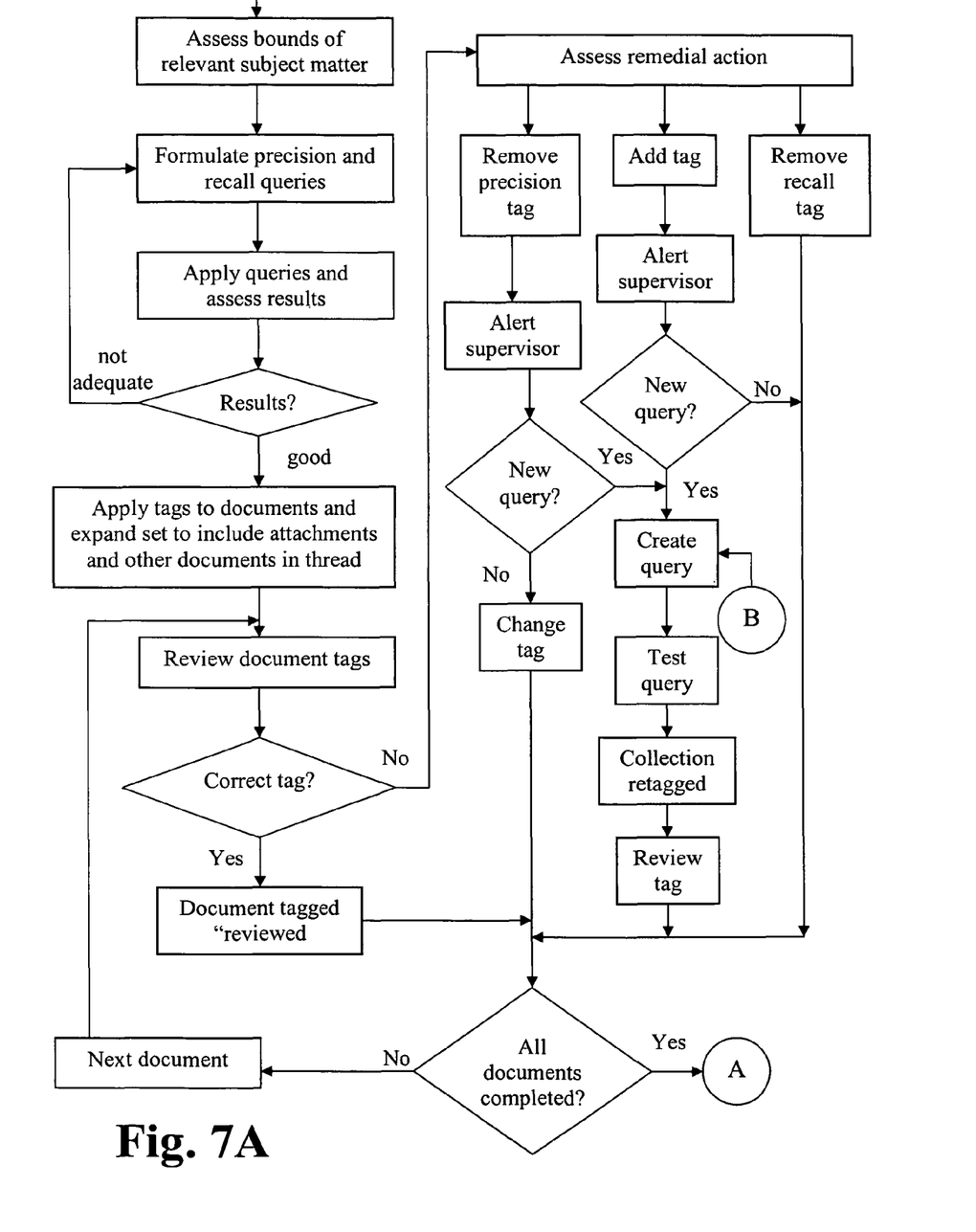
FIGS. 7A and 7B: A flow chart for a workflow of a process including application of some of the techniques discussed herein.
Figure 7B:
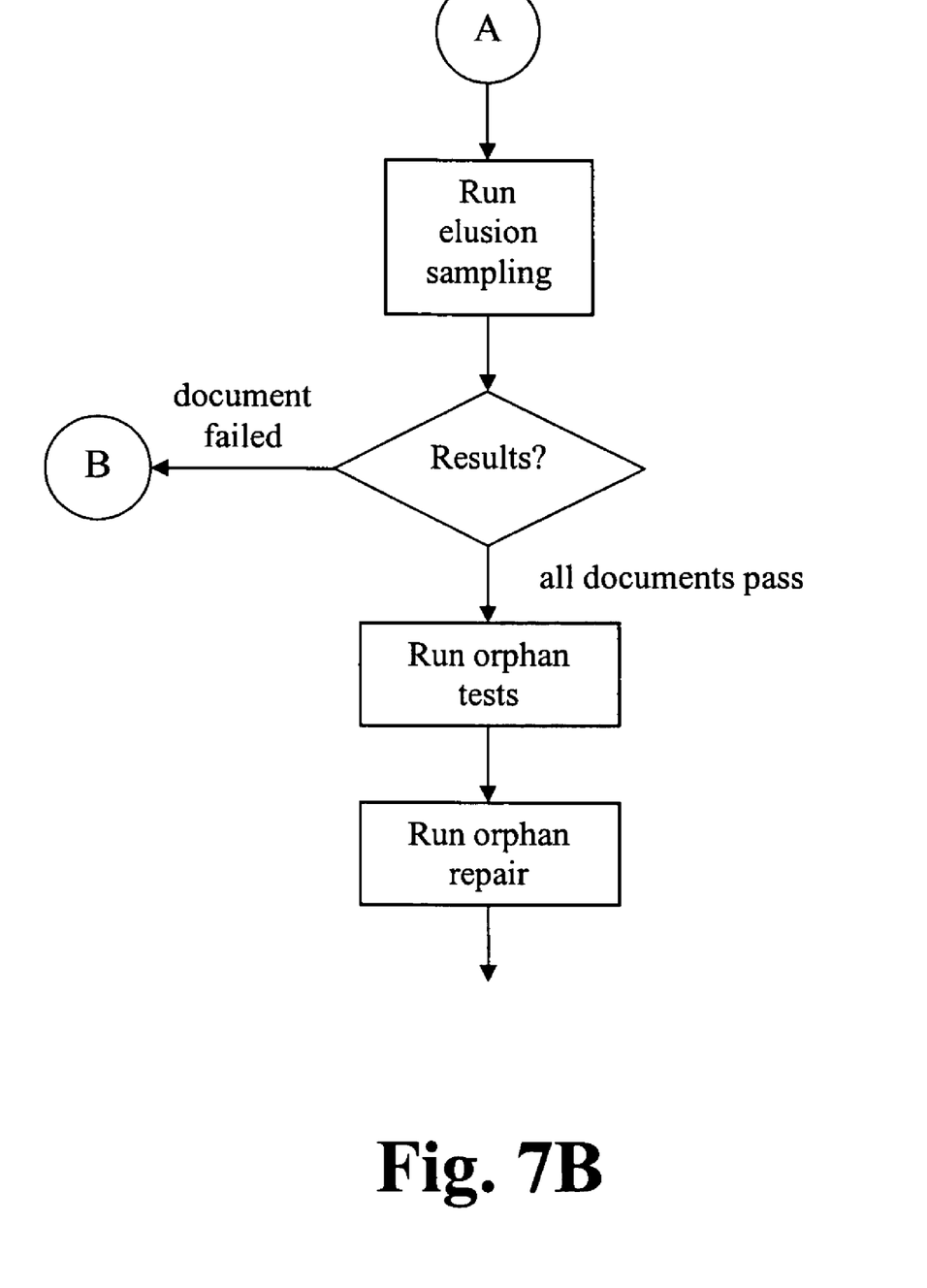

A workflow of a process including application of some of the techniques discussed herein, according to one example, is shown exemplarily in FIGS. 7A and 7B.

The specific embodiments and examples described herein are illustrative, and many variations can be introduced on these embodiments and examples without departing from the spirit of the disclosure or from the scope of the appended claims. For example, features of different illustrative embodiments and examples may be combined with each other and/or substituted for each other within the scope of this disclosure and appended claims.

REFERENCES

Herbert L. Roitblat, "Electronic Data Are Increasingly Important To Successful Litigation" (November 2004).
Herbert L. Roitblat, "Document Retrieval" (2005).
"The Sedona Principles: Best Practices Recommendations & Principles for Addressing Electronic Document Production" (July 2005 Version).

What is claimed is:

1. A method utilizing a computer system including a computer processor, the method for reviewing a collection of documents in electronic form stored in one or more memories wherein the computer system is configured to communicate with the one or more memories to identify relevant documents from the collection of documents, the method comprising the steps of:
   receiving a plurality of query terms in a relevant language string first defined and indicated by a reviewer, via an interface controller of the computer system;
   automatically creating a Boolean query by the system and without user interaction, based on the plurality of query terms in the relevant language string, by applying criteria to refine the relevant language string;
   running a search of the collection of documents in the one or more memories, the search being based on the plurality of query terms of the relevant language string first defined and indicated by the reviewer, the computer processor using the Boolean query to isolate substantially all documents from the collection of documents stored in memory that are relevant to the Boolean query and to return the substantially all documents in a subset of responsive documents from the collection of documents stored in the memory;
   establishing a threshold probability of relevancy for a particular reviewing operation in relation to the collection of documents;
   determining a corresponding probability of relevancy for each document in the subset of responsive documents;
   removing from the subset of responsive documents, documents that do not reach a threshold probability of relevancy established for the particular reviewing operation;
   randomly selecting a predetermined number of documents from a remaining subset of the collection of documents not in the subset of responsive documents, wherein if the randomly selected documents includes one or more additional relevant documents, the query terms are expanded and the search is re-run with the expanded query terms; and
   determining whether the randomly selected documents include additional relevant documents by further refining the Boolean query; and
   comparing a ratio of the additional relevant documents and the randomly selected documents to a predetermined acceptance level, to determine whether to apply a refined set of query terms.

2. The method of claim 1, wherein the probability of relevancy of a document is scaled according to a measure of obscurity of the query terms found in the document.

3. The method of claim 1, wherein the search is applied through a search engine operated by the computer processor.

4. The method of claim 1, wherein the search using the Boolean query is a concept search, and the concept search is applied through a concept search engine operated by the computer processor.

5. The method of claim 1, further comprising the steps of:
   identifying one or more specific query terms in the additional relevant documents that render the documents relevant;
   expanding the query terms to include the specific terms; and
   re-running at least the search with the expanded query terms.

6. The method of claim 1, further comprising the steps of:
   selecting two or more search terms;
   identifying synonyms of the two or more search terms; and
   forming the query terms based on the search terms and synonyms.

7. The method of claim 1, further comprising the steps of:
   identifying a correspondence between a sender and a recipient, in the responsive documents subset;
   automatically determining one or more additional documents which are in a thread of the correspondence, the additional documents not being in the responsive documents subset; and
   adding the additional documents to the responsive documents subset.

8. The method of claim 1, further comprising the steps of:
   determining whether any of the documents in the responsive documents subset includes an attachment that is not in the responsive documents subset; and
   adding the attachment to the responsive documents subset.

9. The method of claim 1, further comprising the step of:
   applying a statistical technique to determine whether remaining documents not in the responsive documents set meet a predetermined acceptance level.

10. A method utilizing a computer system including a computer processor and a memory for reviewing a collection of documents in electronic form stored in the memory to identify relevant documents from the collection, the method comprising the steps of:
   running a search of the collection of documents, the search being based on a plurality of query terms of a relevant language string first defined and indicated by a reviewer to the computer system, and subsequently utilized by the computer processor to automatically create a Boolean query by the system and without user interaction, based on applying criteria to refine the relevant language string, the computer processor using the Boolean query to isolate substantially all documents from the collection of documents stored in memory that are relevant to the Boolean query and to return the substantially all documents in a subset of responsive documents from the collection of documents stored in the memory;
   establishing a threshold probability of relevancy for a particular reviewing operation;

determining a corresponding probability of relevancy for each document in the subset of responsive documents; and removing from the subset of responsive documents, documents that do not reach a threshold probability of relevancy established for the particular reviewing operation, wherein the search includes (a) a precision Boolean search of the collection of documents based on the Boolean query utilizing the plurality of query terms, the Boolean search returning a first subset of responsive documents from the collection, and (b) a second search by applying a recall query based on the plurality of query terms to remaining ones of the collection of documents which were not returned by the Boolean search, the second search returning a second subset of responsive documents in the collection, and wherein the responsive documents subset is composed of the first and second subsets.

11. The method of claim 10, wherein the first Boolean search applies a measurable precision query based on the plurality of query terms.

12. The method of claim 11, further comprising the steps of:
automatically tagging each document in the first subset with a precision tag;
reviewing the document bearing the precision tag to determine whether the document is properly tagged with the precision tag; and
determining whether to narrow the precision query and rerun the Boolean search with the narrowed query terms.

13. The method of claim 10, further comprising the steps of:
automatically tagging each document in the second subset with a recall tag;
reviewing the document bearing the recall tag to determine whether the document is properly tagged with the recall tag; and
determining whether to narrow the recall query and rerun the second search with the narrowed query terms.

14. The method of claim 10, further comprising the step of:
reviewing the first and second subsets to determine whether to modify the query terms and rerun the Boolean search and second search with modified query term.

15. A method utilizing a computer system including a computer processor and one or more memories, the method for reviewing a collection of documents stored in electronic form in the one or more memories to identify substantially all relevant documents from the collection, the method comprising the steps of:
running a first search of the collection of documents, based on a plurality of query terms of a relevant language string first formulated by a reviewer and indicated to the computer system and used by the computer processor of the computer system to automatically create an automatic Boolean query without user interaction based on applying criteria to refine the relevant language string, the computer processor using the automatic Boolean query to isolate substantially all documents from the collection of documents stored in memory that are relevant to the Boolean query, the search returning a subset of responsive documents from the collection stored in memory including all documents relevant to the Boolean query;
utilizing the computer processor to automatically identify a correspondence between a sender of a particular document in the collection of documents stored in memory and a recipient of a particular document in the collection of documents stored in the memory, which are included in the subset of responsive documents;
automatically determining additional documents which are determined to be in a thread of the correspondence between the sender and the recipient, but not included in the subset of responsive documents;
adding the additional documents in the thread of correspondence to the subset of responsive documents;
randomly selecting a predetermined number of documents from a remainder of the collection of documents not in the responsive documents subset;
determining whether the randomly selected documents include additional relevant documents;
comparing a ratio of the additional relevant documents and the randomly selected documents to a predetermined acceptance level; and
expanding the query terms and rerunning the search with the expanded query terms, if the ratio does not meet the predetermined acceptance level.

16. The method of claim 15, wherein the search is applied through a search engine operated by the computer processor.

17. The method of claim 15, wherein the search using the Boolean query includes a concept search, and the concept search is applied through a concept search engine operated by the computer processor.

18. The method of claim 15, further comprising the steps of:
determining for each document in the subset of responsive documents, a corresponding probability of relevancy; and
removing from the subset of responsive documents those documents that do not reach a threshold probability of relevancy.

19. The method of claim 18, wherein the probability of relevancy of a document is scaled according to a measure of obscurity of the query terms found in the document.

20. The method of claim 15, further comprising the step of:
applying a statistical technique to determine whether a remaining subset of the collection of documents not in the responsive documents subset meets a predetermined acceptance level.

21. The method of claim 15, further comprising the step of:
randomly selecting a predetermined number of documents from a remainder of the collection of documents not in the responsive documents subset;
determining whether the randomly selected documents include additional relevant documents;
identifying one or more specific terms in the additional relevant documents that render the documents relevant;
expanding the query terms to include the specific terms; and
re-running the search with the expanded query terms.

22. The method of claim 15, further comprising the steps of:
selecting two or more search terms;
identifying synonyms of the search terms; and
forming the query terms based on the search terms and synonyms.

23. The method of claim 15, further comprising the step of:
determining whether any of the responsive documents in the responsive documents subset includes an attachment that is not in the subset; and
adding the attachment to the subset.

* * * * *